United States Patent [19]

Ichikawa

[11] Patent Number: 4,878,126

[45] Date of Patent: Oct. 31, 1989

[54] IMGAE PROCESSING APPARATUS

[75] Inventor: Hiroyuki Ichikawa, Kawasaki, Japan

[73] Assignee: Canon Kabushiki Kaisha, Tokyo, Japan

[21] Appl. No.: 338,425

[22] Filed: Apr. 14, 1989

Related U.S. Application Data

[63] Continuation of Ser. No. 256,253, Oct. 6, 1988, abandoned, which is a continuation of Ser. No. 15,926, Feb. 18, 1987, abandoned.

[30] Foreign Application Priority Data

Feb. 19, 1986 [JP] Japan ............................. 61-032926
Feb. 19, 1986 [JP] Japan ............................. 64-32928

[51] Int. Cl.$^4$ ............................................. H04N 1/393
[52] U.S. Cl. ..................................... 358/451; 358/456
[58] Field of Search .......................... 358/280, 283, 287

[56] References Cited

U.S. PATENT DOCUMENTS

| 4,506,301 | 3/1985 | Kingsley | 358/287 |
| 4,578,712 | 3/1986 | Matsunawa | 358/283 |
| 4,679,096 | 7/1987 | Nagashima | 358/287 |
| 4,680,720 | 7/1987 | Yosh II | 358/287 |
| 4,701,808 | 10/1987 | Nagashima | 358/287 |

FOREIGN PATENT DOCUMENTS

| 0023816 | 2/1981 | European Pat. Off. |
| 1448112 | 9/1976 | United Kingdom . |
| 1536000 | 12/1978 | United Kingdom . |
| 2037532 | 7/1980 | United Kingdom . |
| 2064913 | 6/1981 | United Kingdom . |
| 1597484 | 9/1981 | United Kingdom . |
| 2087683 | 5/1982 | United Kingdom . |
| 2103449 | 2/1983 | United Kingdom . |
| 2120896 | 12/1983 | United Kingdom . |
| 2139454 | 11/1984 | United Kingdom . |

Primary Examiner—Howard W. Britton
Attorney, Agent, or Firm—Fitzpatrick, Cella, Harper & Scinto

[57] ABSTRACT

There is an image processing apparatus such as a copying apparatus for processing an input image data. This apparatus comprises: an image scanner such as a CCD to digitally read out the image data from a document; a discriminating unit to discriminate whether the input image data is the halftone image data such as a photograph or single density image data such as characters or symbols; a magnification change unit to change the magnification of the image data; and a smoothing unit to smooth the image data in the case where the discriminating unit decides that the input image data is the halftone image data when the magnification change unit performs the magnification changing process. The discriminating unit executes the above discrimination on the basis of the density levels of or density difference between a target pixel and its peripheral pixels in the input image data. With this apparatus, the magnification of the halftone image can be smoothly changed.

19 Claims, 6 Drawing Sheets

IMGAE PROCESSING APPARATUS

This application is a continuation of application Ser. No. 256,253 filed Oct. 6, 1988, which is a continuation of application Ser. No. 015,926, filed Feb. 18, 1987, now abandoned.

BACKGROUND OF THE INVENTION

1. Field of the Invention

The present invention relates to an image processing apparatus for processing input image data.

2. Related Background Art

Hitherto, for example, there have been known copying apparatuses as such a kind of image processing apparatus. Some such copying apparatuses have a magnification changing function to digitally read the original document image by a solid state image pickup device such as a line-shaped image scanner (CCD) or the like and to perform enlargment, reduction, or the like of the read image. As a general magnification changing method in those apparatuses, there has been known a method whereby the magnification in the feeding direction is changed by changing the scan velocity in the sub scan direction (direction of relative motion between original and scanner, to feed the image to the CCD). There has been known another method whereby the magnification in the main scan direction is changed by performing storage, thin-out, or the like of the pixels in the main scan direction (perpendicular to the feeding direction).

For example, when enlarging an image three times, assuming that the moving velocity in the sub-scan direction in the direct copy mode (i.e., at equal magnification) is $V_1$, the moving direction of the sub-scan direction is set to $V_1/3$. With respect to the main scan direction, the image data of one pixel is repeatedly output three times. In this manner, a triple (output) size image is formed.

Figure 6:
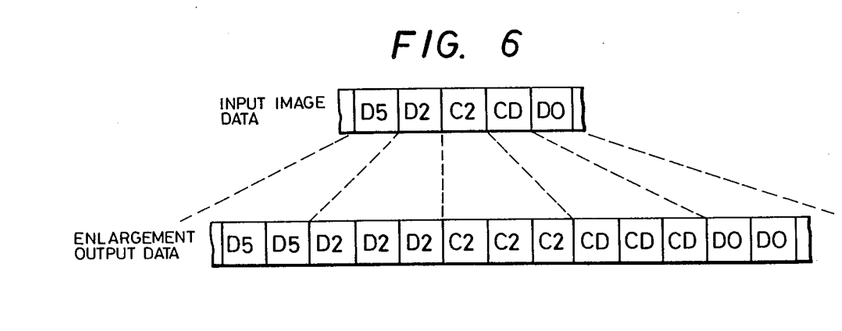
FIG. 6 is a diagram showing the conventional enlarging process.

However, if the magnification changing process is performed by only the above method, as shown in FIG. 6, the enlarged output image has the same data on a three-pixel unit basis. Therefore, this method is preferably to enlarge characters, symbols, or the like having a single density. However, for example, in the case of changing the magnification of a half-tone image having a smooth density change such as in a photograph or the like, the foregoing method is unpreferable to obtain a smooth image.

SUMMARY OF THE INVENTION

It is an object of the present invention to provide an image processing apparatus which can eliminate the foregoing drawbacks in the conventional techniques.

It is also an object of the invention to provide an image processing apparatus which can smoothly change the magnification of a halftone image.

It is also an object of the invention to provide an image processing apparatus in which, in the magnification changing process which is executed for the input image data having both data of a single density and halftone image data, when the magnification of the halftone data in the input image data to be changed, the density change is smoothed and the magnification changing process is executed.

Practically speaking, the image processing apparatus according to the invention comprises: a primary differentiation unit to detect a density change in input image data; a magnification change unit to change the magnification of the input image data; a smoothing unit to perform the smoothing process in the magnification changing process for the halftone image; and a selector to switch the single density data and halftone data whose magnifications were changed, wherein when the primary differentiation unit detects that the halftone image data exists in the input image data, the density change is smoothly processed in the magnification changing process for the halftone image data in the input image data.

According to still another aspect of the invention, it is an object of the invention to provide an image processing apparatus which can calculate the primary differentiation as the density change of the input image without changing the region of the input image to calculate the density change of the input image.

Practically speaking, the image processing apparatus according to the invention comprises: a latch unit to temporarily store target pixel data in the input image data and peripheral pixel data within a predetermined range from the target pixel; and a calculator to calculate a change in density level (primary differentiation) near the target pixel from the latched pixel data, wherein the density level change in the input image data is calculated and it is detected whether a single density image exists or not or whether half tone image data exists or not and thereafter, the subsequent image processes are executed.

These and other objects, features and advantages of the invention will be more fully appreciated from a consideration of the following detailed description of the preferred embodiment taken in conjunction with the accompanying drawings.

DESCRIPTION OF THE PREFERRED EMBODIMENT

The preferred embodiment according to the present invention will be described in detail hereinbelow with reference to the drawings.

Figure 7:
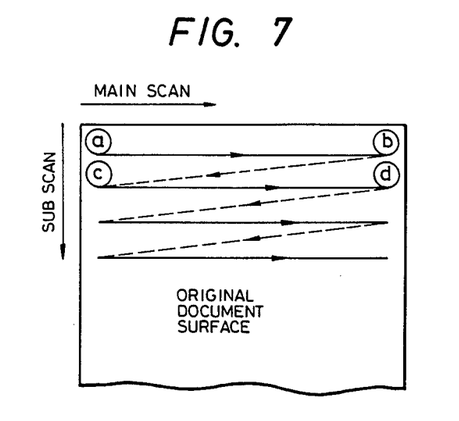
FIG. 7 is a diagram showing the image reading process.
Figure 8:
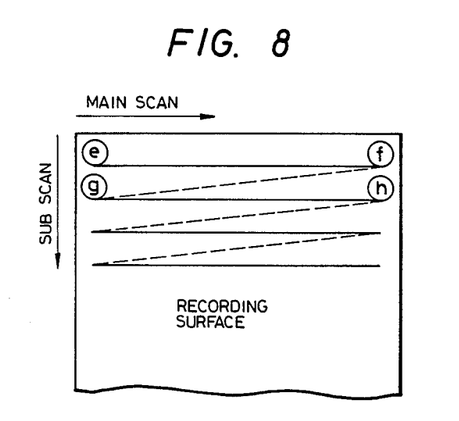
FIG. 8 is a diagram showing the processing operation when an output image is formed.

As a method of reading an image, for example, there is a method whereby a number of (e.g., 128) pixels in a solid state image pickup device such as a line-shaped image scanner (CCD) or the like are arranged in the sub-scan direction and the image data in the image pickup device is transferred in the sub scan direction, thereby digitally reading the image data. For example, if the width of CCD is 8 mm, the image of a width of 8 mm is read every scanning operation. Thus, in FIG. 7, the image of a width of 8 mm is read from ⓐ to ⓑ and the scanning operation is then returned from ⓑ to ⓒ. Thereafter, the image data is sequentially read from ⓒ to ⓓ and from the subsequent image region in a manner similar to the above. An ink jet head (head unit) having e.g., 128 nozzles across a width of 8 mm is used as the image forming mechanism. This ink jet head scans from ⓔ to ⓕ on a 8 mm-width unit basis as shown in FIG. 8, thereby forming the image. Then, the ink jet head is returned from ⓕ to ⓖ. Similarly to the above, the image is sequentially formed on a 8 mm unit basis.

Figure 1:
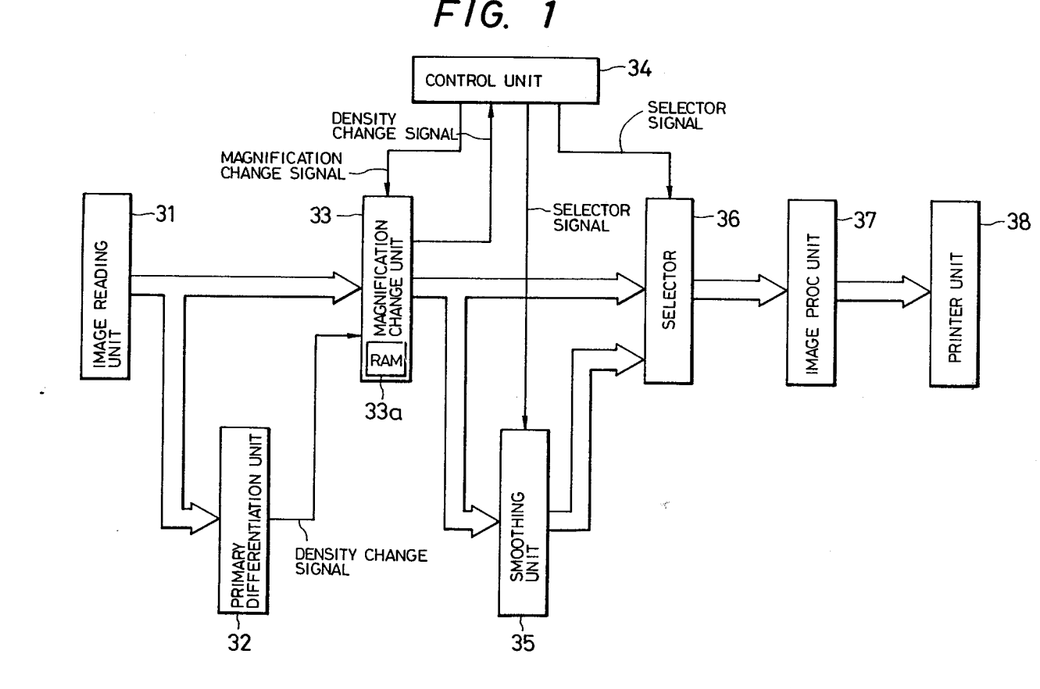
FIG. 1 is an overall block diagram of an image processing apparatus of an embodiment according to the invention.

On the basis of the image input and output mechanisms as explained above, an image processing apparatus of the embodiment will be described with reference to FIG. 1.

In the diagram, an image reading unit 31 reads an original document image and digitizes the density level of the image data and outputs the digital data. A primary differentiation unit 32 sequentially reads the pixel data which is output from the image reading unit 31 and calculates a change in density of a target pixel. A magnification change unit 33 changes the magnification of the input image data on the basis of a magnification changing instruction from a control unit 34. A smoothing unit 35 smooths the image data whose magnification was changed by the magnification change unit 33. A selector 36 switches the image data which are output from the smoothing unit 35 and magnification change unit 33 and outputs the selected image data to an image processing unit 37. A printer unit 38 visualizes the image data processed by the image processing unit 37 and records it.

The image signal read by the image reading unit 31 is converted into digital density data and supplied to the primary differentiation unit 32. The primary differentiation unit 32 calculates a change ratio (primary differentiation value D) of the density near a target pixel on the basis of the pixel data before and after the target pixel data in accordance with the following equation.

$$D = \{|(a+b) - (d+e)|\}/2 \quad (1)$$

where,
D: primary differentiation value of the target pixel,
a: pixel data of the pixel which exists after the target pixel by two pixels,
b: pixel data of the pixel which exists after the target pixel by one pixel,
d: pixel data of the pixel which exists before the target pixel by one pixel,
e: pixel data of the pixel which exists before the target pixel by two pixels.

When the primary differentiation value D is above a predetermined value, the signal level is set to "1". When the value D is below the predetermined value, the signal level is set to "0". The signal of "0" or "1" (hereinafter, this signal is referred to as the density change signal) is output to the magnification change unit 33, which will be explained hereinafter.

The density change of the pixels on both sides including the target pixel is calculated by the equation (1). As the density change is large, the value of D increases. Therefore, when the primary differentiation value D is above the predetermined value, it is determined that the input image data includes characters or symbols which are the data having a single density. When the value D is below the predetermined value, it is decided that the input image is the half tone image data such as a photograph or the like.

Both of the pixel data read by the image reading unit 31 and the density change signal from the primary differentiation unit 32 are input to the magnification change unit 33.

Further, the magnification of the pixel data input to the magnification change unit 33 is changed by an instruction from the control unit 34 in accordance with the magnification which is designated by an operating switch (not shown) or the like. The pixel data whose magnification was changed is temporarily stored into a magnification change RAM 33a in the magnification change unit 33.

The image data read out of the RAM 33a is input to the smoothing unit 35. The density change signal is input to the control unit 34. The control unit 34 outputs a selector (or select) signals to the smoothing unit 35 and a selector 36 under such conditions as shown in Table 1.

The image data which was smoothed by the smoothing unit 35 in accordance with the magnification and the image data from the magnification change unit 33 are input to the selector 36. The control unit 34 selects either one of those image data.

TABLE 1

| Density change signal | Magnification | Selector signal |
|---|---|---|
| "0" half tone data | Equal magnification | Magnification change unit |
| | Double | Smoothing unit |
| | Triple | Smoothing unit |
| "1" single density data | Equal magnification | Magnification change unit |
| | Double | Magnification change unit |
| | Triple | Magnification change unit |

As described above, either one of the output image data from the magnification change unit 33 and smoothing unit 35 is selected by the selector signal, so that the selected image data is output from the selector 36.

The image data selected by the selector 36 is processed by the image processing unit 37 and converted into the dot data. Thereafter, the dot data is output to the printer unit 38 and the output image is formed by the printer unit.

Figure 2:
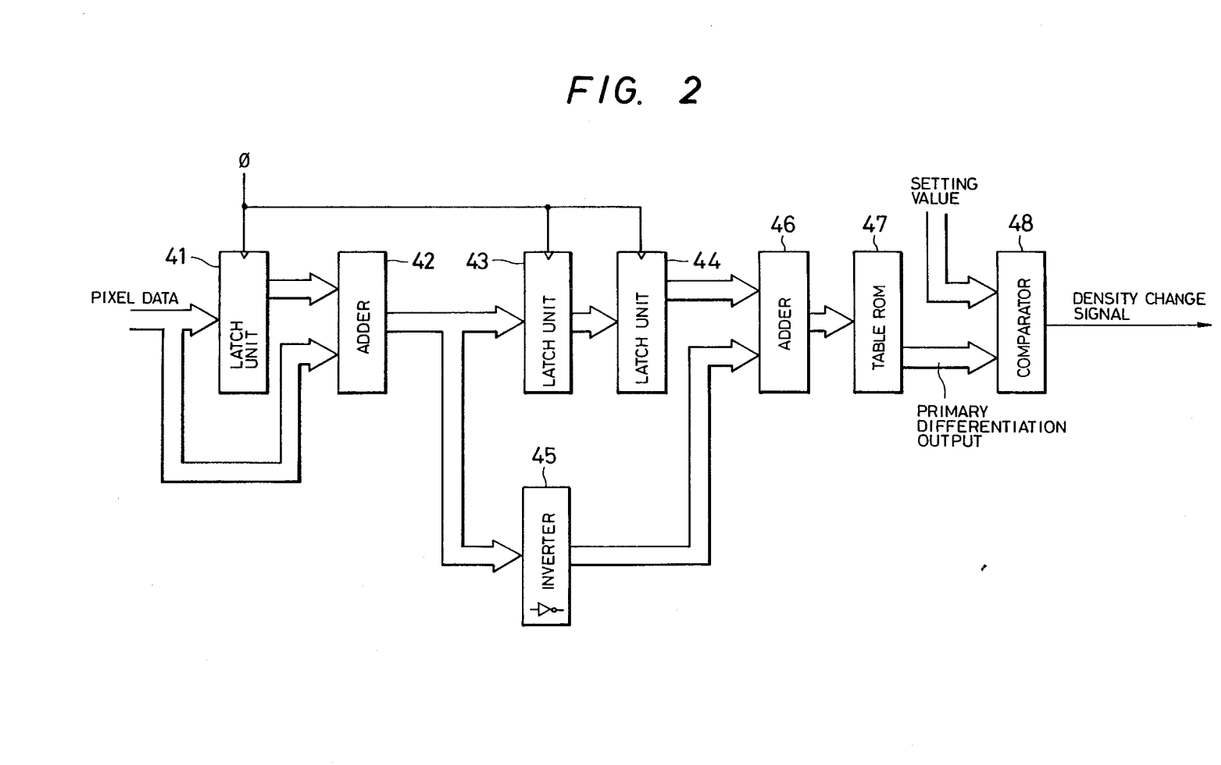
FIG. 2 is a block diagram of a primary differentiation unit.

The operation of the primary differentiation unit 32 will now be described with reference to FIG. 2. The foregoing equation (1) is obtained in the primary differentiation unit 32.

The pixel data which was output from the image reading unit 31 and converted into the density data is delayed by the time corresponding to one pixel by a video clock $\phi$ in a latch unit 41 and thereafter, the delayed data is input to the adder 42. The pixel data and the pixel data which was delayed by the time corresponding to one pixel are input to the adder 42 and added. The output of the adder 42 is supplied to a latch unit 43 and an inverter 45. In the latch units 43 and 44, each input pixel data is delayed by the time corresponding to one pixel by the video clock $\phi$. The delayed pixel data is input to an adder 46. On the other hand, the data input to the inverter 45 is inverted and output to the adder 46 as the 1's complementary number. The adder 46 adds "1" to the input data from the inverter 45 to make the 2's complementary number from the 1's complementary number. The adder 46 adds the 2's complementary number to the output of the latch 44, thereby performing the subtraction between the output image data of the adder 42 and the output data of the latch 44. The output of the adder 46 is supplied as the address to a table ROM 47. The data which is set to ½ with respect to the input address is previously stored in the table ROM 47 and is output therefrom. In this manner, the input data is reduced by half by the table ROM 47 and is output as primary differentiation data. The primary differentiation data is input to a comparator 48 and compared with a preset value. If the primary differentiation value is larger than the preset value, the signal level is set to "1". If it is smaller than the preset value, the signal level is set to "0". The signal is "1" or "0" is output as the density change signal. The preset value may be arbitrarily set into the comparator 48 by an instruction from the outside.

Figure 3:
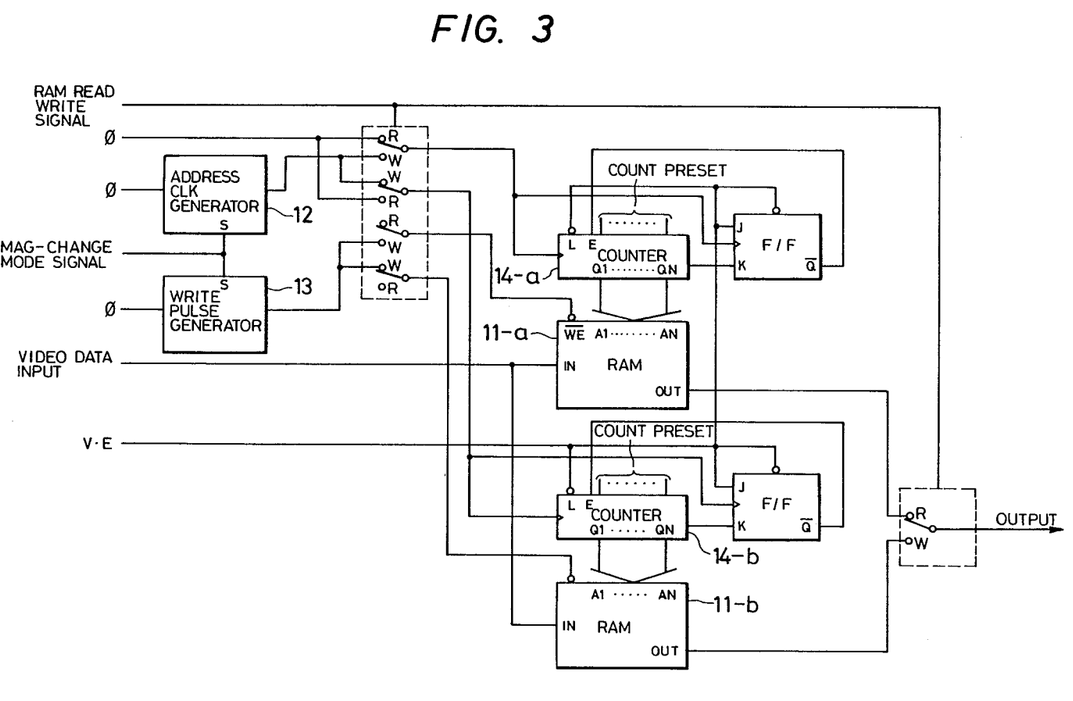
FIG. 3 is a block diagram of a magnification change unit.

The process which is executed by the magnification change unit 33 will now be described with reference to FIG. 3.

The magnification changing process in the sub scan direction is performed by setting a sub scan velocity $V_1$ of the printer in the reading unit to a constant value and by changing the velocity of the reader to a $V_1/n$ (n: magnification ratio). The description of this process is omitted.

In the magnification changing process in the main scan direction, a magnification changing (mag-change) mode signal is input from a controller (not shown) to a memory control unit. The memory control unit includes an address clock generator 12 and a write pulse generator 13. The memory control unit determines the numbers of clock pulses of address counters 14-a and 14-b in the case of writing the input video data into magnification change (mag-change) buffer memories 11-a and 11-b. The memory control unit also allows the write pulse generator 13 to generate a write pulse to the mag-change buffer memories. The magnification changing process in the main scan direction is accomplished by increasing or decreasing the numbers of clock pulses and write pulses in accordance with the magnification change ratio. The writing and reading operations into or from the buffer memories 11-a and 11-b are alternately performed. For example, if the image data is enlarged n times, the data of the same pixel is written into n addresses in the mag-change buffer memory 11-b which is set in the writing mode (W) between those buffer memories. On the contrary, in the case of reducing the image data to 1/n, one of n pixels is written into one address. When the buffer memory is set into the reading mode, the address is increased by "1" by the video clock $\phi$, so that the interpolation and thin-out of the pixel data are realized.

Although the motor velocity on the image reading side has been changed in the foregoing embodiment, the motor velocity on the recording side may be also changed.

Figure 4:
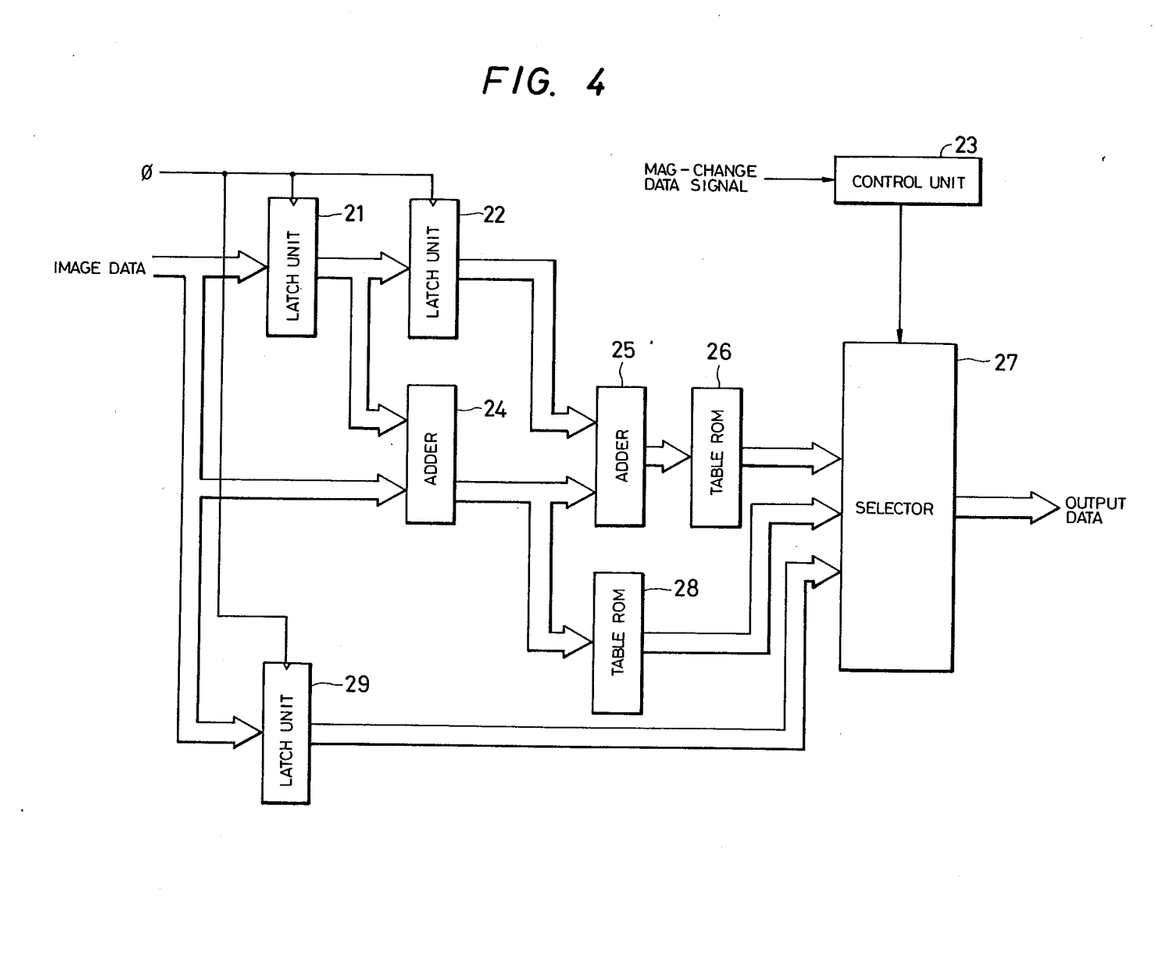
FIG. 4 is a block diagram of a smoothing unit.

The processing apparatus of the smoothing unit 35 will now be described with reference to FIG. 4.

The smoothing unit 35 has a primary matrix corresponding to the magnification change ratio. For example, the primary matrix of 1×2 in the case of doubling the image data, and the primary matrix of 1×3 when tripling the image data are stored in the smoothing unit 35. The following arithmetic operation is performed on the basis of the above matrix.

Namely, in the case of doubling the image data:

$$D=\tfrac{1}{2}(a+b):1\times 2$$

When tripling the image data:

$$D=\tfrac{1}{3}(a+b+c):1\times 3$$

where,
- D: output image data of a target pixel,
- b: input image data of the target pixel,
- a: input image data of the pixel which exists after the target pixel data by one pixel,
- c: input image data of the pixel which exists before the target pixel data by one pixel.

The size of matrix is switched in accordance with the enlargement magnification. In this embodiment, the matrix is set to only 1×2 or 1×3. However, no problem will be caused even if the matrix size of 1×n (when the image data is enlarged n times) is used in accordance with the enlargement magnification.

The smoothing unit 35 executes the smoothing process in the following manner.

(In the case of equal magnification)

The output image data from the mag-change buffer RAM is delayed by the time corresponding to one pixel by a latch unit 29 and supplied to a selector 27. The selector 27 selects the image data of the equal magnification on the basis of a selection signal from a control unit 23 and outputs it.

(In the case of double magnification)

The enlarged image data is delayed by the time corresponding to one pixel by a latch unit 21. The delayed image data is added to the enlarged input image data by an adder 24. The added data is output as address data to a table ROM 28 and averaged to ½. The averaged data is output to the selector 27. In the table ROM 28, there is the one-to-one corresponding relation between the input and the output. As mentioned above, the selector 27 selects the output data from the table ROM 28 and outputs by the selection signal from the control unit 23.

(In the case of triple magnification)

The delayed data from the latch unit 21 is further delayed by the time corresponding to one pixel by a latch unit 22. The delayed output of the latch unit 22 and the output of the adder 24 are added by an adder 25 and the added data is supplied to a table ROM 26. The input data is averaged into ⅓ by the table ROM 26 and the averaged data is supplied to the selector 27. The selector 27 selects the output from the table ROM 26 and outputs in response to the selection signal from the control unit 23.

The magnification enlarging process is executed in accordance with each magnification as described above.

Figure 5:
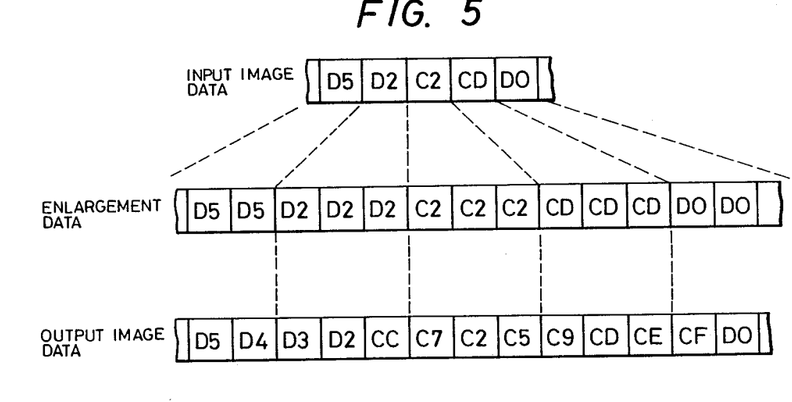
FIG. 5 is a diagram showing an example of the enlarging process of the embodiment.

FIG. 5 shows the output image which is derived after, for example, the tripled image data from the magnification change unit 33 has been smoothed by the smoothing unit 35. As compared with the output image which is constituted by merely arranging three target pixel data (in the case of triple magnification) and by outputting them as in the conventional enlarging process (FIG. 6), it will be understood that according to the present embodiment, the enlarged output image can be processed by smoothing its density level.

In the foregoing smoothing process, when the density change signal from the primary differentiation unit 32 is "0", namely, when it is determined that the input image is the half tone image because the primary differentiation value D of the equation (1) is below the predetermined value, the control unit 34 outputs the selector signal indicative of the half tone image to the selector 36, thereby allowing the image data from the smoothing unit 35 to be output to the image processing unit 37.

On the contary, when the primary differentiation value D is above the predetermined value, the density change signal to the control unit 34 is set to "1". The control unit 34 outputs the selector signal indicative of the single density image to the selector 36, thereby allowing the image data from the magnification change unit 33 to be output to the image processing unit 37.

As described above, according to the embodiment, if it is detected that halftone image data is contained in the input image data when the magnification of the input image data is changed and the resultant data is output, the discontinuous density change of only the halftone image data can be smoothed in the magnification changing process by a small scale circuit constitution.

On the other hand, by calculating the primary differentiation value (density change ratio) of the density of input image before magnification changing process is executed, it can be calculated without changing the region of the pixel regarding the calculation. From the primary differentiation value, it is possible to soon determine whether the input image is single density image data such as characters, symbols, or the like or halftone image data such as a photograph or the like by means of an arrangement of, an extremely simple construction.

Although the case where the density change of the input image is calculated and used for the magnification changing process has been described in the foregoing embodiment, the invention is not limited to this case. For example, the invention can be also applied to another image processing apparatus having the function of detecting the edge portion(s) of the input image.

In the foregoing embodiment, the primary differentiation value has been calculated from two pixel data before and after the target pixel. However, two or more adjacent pixels of the target pixel may be also read out.

Further, in the application of this embodiment to the magnification changing process, when the input image data is enlarged or reduced and the resultant data is output, if it is detected that halftone image data is contained in the input image, the discontinuous density change of only the halftone image data can be smoothed in the magnification changing process by a small scale circuit constitution.

This embodiment has been described only in the case where the magnification is either equal magnification, double magnification, or triple magnification. However, the invention can be also applied to other magnifications.

The invention is not limited to the foregoing image reading apparatus and output image forming apparatus. For example, a laser beam printer or the like may be also used as the output image forming apparatus.

Moreover, the invention can be also applied to the smoothing process of the image data whose magnification has been changed by a conventional method.

As described above, according to the invention, the input image data is discriminated whether it is single density image data or halftone image data and the magnification changing process is executed. Thus, the output image after the magnification of the half tone image data has been changed can be smoothed.

By calculating the density change ratio of the input image before performing the magnification changing process, the density change ratio can be calculated without changing the region of the pixel concerned with the calculation.

From the density change ratio, it is possible to soon discriminate whether the input image is single density image data or halftone image data by means of an arrangement of an extremely simple constitution.

The present invention is not limited to the foregoing embodiment but many modifications and variations are possible within the spirit and scope of the appended claims of the invention.

What is claimed is:

1. An image processing apparatus comprising:
   image data input means for inputting image data; and
   magnification changing process means for performing, on the basis of a designated magnification, a magnification changing process for the image data input by said image data input means;
   wherein said magnification changing process means has a first output mode and a second output mode, and wherein, in said first output mode, said process means performs in a first mode the magnification changing process of the input image data on the basis of the designated magnification to output first magnification-changed image data, and in said second output mode said process means performs in a second mode the magnification changing process for the input image data on the basis of the designated magnification to output second magnification-changed image data, and
   wherein said process means is capable outputting the first and second magnification-changed image data which are different from each other with respect to the same input image data and the same designated magnification.

2. An image processing apparatus according to claim 1, wherein, in said first mode, the input image data is interpolated or thinned out for the magnification changing process, and in said second mode, the image data magnification-changed in said first mode is further smoothing-processed.

3. An image processing apparatus according to claim 1, further comprising select means for selecting either one of the first magnification-changed image data output in said first output mode and the second magnification-changed image data output in said second output mode.

4. An image processing apparatus according to claim 3, further comprising discrimination means for discriminating an image content of the image data input by said input means, and wherein said select means performs selection in accordance with a discrimination result of said discrimination means.

5. An image processing apparatus according to claim 4, wherein said discrimination means further comprises differentiating means for calculating a density changing rate of the input image data.

6. An image processing apparatus according to claim 4, wherein when the designated magnification is one-to-one magnification, said selection means selects the image data processed in said first mode irrespective of the discrimination result of said discrimination means.

7. An image processing apparatus according to claim 4, wherein said discrimination means discriminates whether or not the input image data is a half-tone image on the basis of a density of the input image data.

8. An image processing apparatus comprising:
   image data input means for inputting image data; and
   magnification changing process means for performing magnification changing process for the input image data on the basis of a designated magnification, wherein said process means includes first and second output modes, and in said first output mode, the input image data is interpolated or thinned out based on the designated magnification to output first magnification-changed image data, and in said second output mode, a predetermined processing based on the designated magnification is further performed for the first magnification-changed image data which was interpolated or thinned out in said first output mode, to output second magnification-changed image data; and
   select means for selecting either one of the first and second magnification-changed image data.

9. An image processing apparatus according to claim 8, wherein the predetermined process includes a smoothing process, and the predetermined process makes an area size different in accordance with the designated magnification.

10. An image processing apparatus according to claim 8, further comprising discrimination means for discriminating an image content of the image data input by said input means, and wherein said select means performs selection in accordance with a discrimination result of said discrimination means.

11. An image processing apparatus according to claim 10, wherein said discrimination means discriminates whether or not the input image data is a halftone image, on the basis of a density of the input image data.

12. An image processing apparatus according to claim 10, wherein, when the designated magnification is one-to-one magnification said select means selects the first magnification-changed image data irrespective of the discrimination result of said discrimination means.

13. An image processing apparatus comprising: pixel data input means for inputting pixel data; and
   pixel number conversion means for performing, on the basis of a predetermined designation, a pixel number conversion process for the pixel data input by said pixel data input means, wherein said number conversion means has a first output mode and a second output mode and in said first output mode, said pixel number conversion means performing the pixel number conversion process of the input pixel data on the basis of the predetermined designation to output first pixel data in which the pixel number has been converted, and in said second output mode, said pixel number conversion means performing the pixel number conversion process for the input pixel data on the basis of the predetermined designation to output second pixel data in which the pixel number has been converted, and wherein said conversion means is capable of outputting the first and second pixel data which are different from each other even if their pixel numbers have been converted into the same number.

14. An image processing apparatus according to claim 13, wherein the input pixel data is interpolated or thinned out for the pixel number conversion process in said first mode, and the pixel data in which the pixel number has been converted in said first mode is further smoothing-process in said second mode.

15. An image processing apparatus according to claim 13, further comprising select means for selecting either one of the first pixel data in which the pixel number has been converted in said first output mode, or the second pixel data in which the pixel number has been converted in said second output mode 16. An image processing apparatus according to claim 15, further comprising discrimination means for discriminating an image content of the pixel data input by said input means prior to the pixel number conversion process by said pixel number conversion means, wherein said select means performs selection in accordance with a discrimination result of said discrimination means.

17. An image processing apparatus according to claim 16, wherein the predetermined designation represents a designated magnification and said selection means selects the pixel data process in said first mode regardless of the discrimination results of said discrimination means when the designated magnification is one-two-one.

18. An image processing apparatus according to claim 16, wherein said discrimination means discriminates whether or not the pixel data represents a half-tone image on the basis of a density of the pixel data.

19. An image processing apparatus according to claim 18, wherein said discrimination means further comprises differentiating means for calculating a density changing rate of the input pixel data.

* * * * *

UNITED STATES PATENT AND TRADEMARK OFFICE
CERTIFICATE OF CORRECTION

PATENT NO. : 4,878,126
DATED : October 31, 1989
INVENTOR(S) : HIROYUKI ICHIKAWA

Page 1 of 3

It is certified that error appears in the above-identified patent and that said Letters Patent is hereby corrected as shown below:

IN [54] TITLE

"IMGAE" should read --IMAGE--.

IN [30] FOREIGN APPLICATION PRIORITY DATA

"Japan ........... 64-32928" should read
--Japan .......... 61-032928--.

IN [56] REFERENCES CITED

U.S. PATENT DOCUMENTS, "Yosh II" should read
--Yoshii et al.--

IN [57] ABSTRACT

Line 6, "the" should be deleted.
Line 11, "the" (second occurrence) should be deleted.
Line 18, "the" should be deleted.

COLUMN 1

Line 2, "IMGAE" should read --IMAGE--.
Line 35, "moving direction" should read
--moving velocity--.
Line 44, "bly to" should read --bly used to--.
Line 63, "to be changed," should read
--is to be changed,--.

UNITED STATES PATENT AND TRADEMARK OFFICE
CERTIFICATE OF CORRECTION

PATENT NO. : 4,878,126

DATED : October 31, 1989

INVENTOR(S) : HIROYUKI ICHIKAWA

It is certified that error appears in the above-identified patent and that said Letters Patent is hereby corrected as shown below:

COLUMN 4

Line 19, "a" should be deleted.
Line 57, "the adder 42." should read --an adder 42.--.

COLUMN 5

Line 15, "signal is" should read --signal of--.
Line 22, "sub scan" should read --sub-scan--.
Line 23, "sub scan" should read --sub-scan--.
Line 25, "a" should be deleted.
Line 59, "apparatus" should read --operation--.

COLUMN 7

Line 33, "of," should read --of--.

COLUMN 9

Line 38, "magnification" should read --magnification,--.
Line 41, "comprising: pixel" should read --comprising: ¶ pixel--.

UNITED STATES PATENT AND TRADEMARK OFFICE
CERTIFICATE OF CORRECTION

PATENT NO. : 4,878,126

DATED : October 31, 1989

INVENTOR(S) : HIROYUKI ICHIKAWA

It is certified that error appears in the above-identified patent and that said Letters Patent is hereby corrected as shown below:

COLUMN 10

Line 19, "smoothing-process" should read --smoothing-processed--.
Line 40, "two-one." should read --to-one.--.

Signed and Sealed this

Eleventh Day of December, 1990

Attest:

HARRY F. MANBECK, JR.

*Attesting Officer*     *Commissioner of Patents and Trademarks*